No. 617,100. Patented Jan. 3, 1899.
E. P. HOLLY.
WATER RETURN SYSTEM FOR STEAM GENERATORS.
(Application filed May 29, 1897.)
(No Model.) 4 Sheets—Sheet 1.
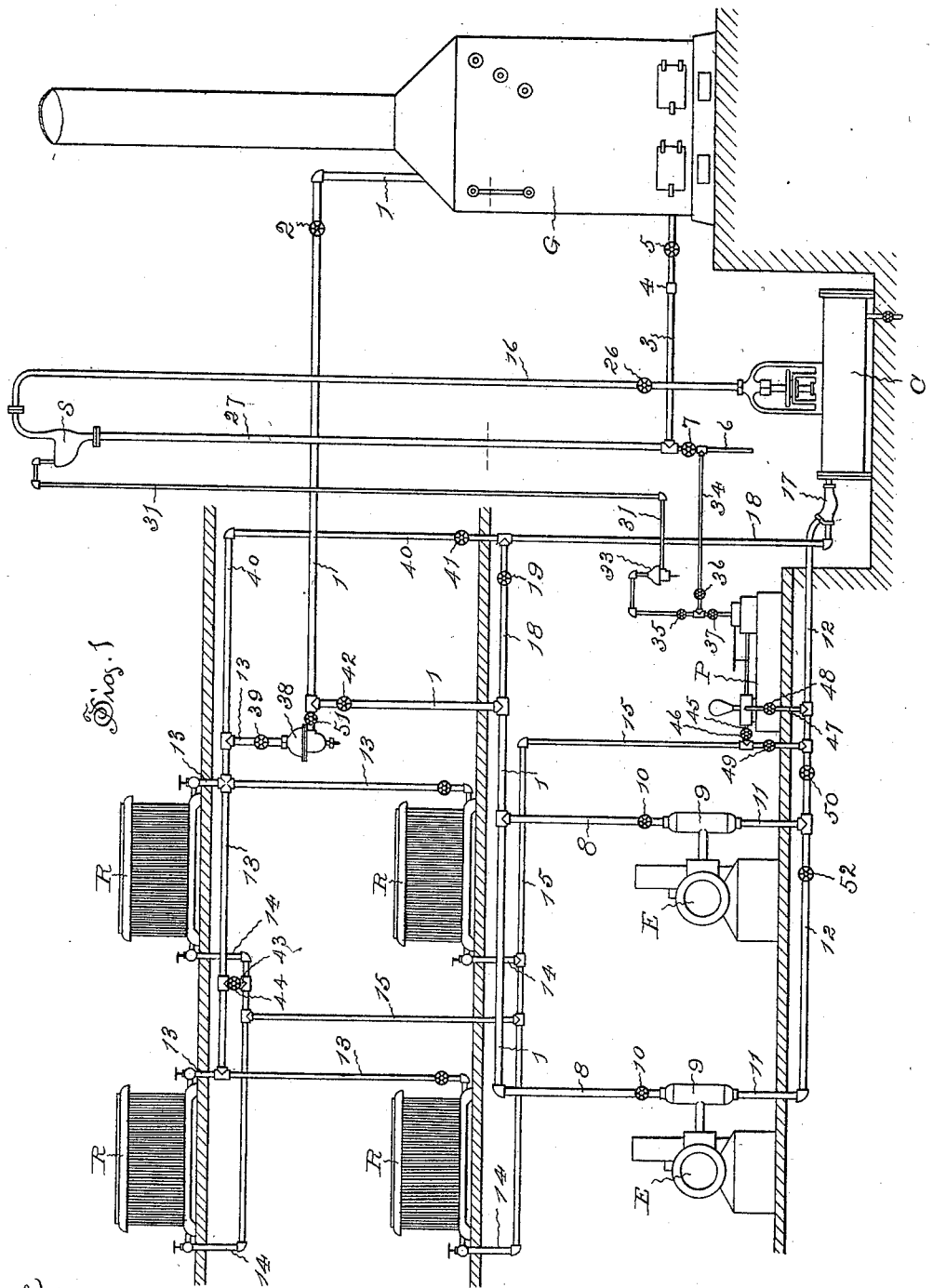

No. 617,100. Patented Jan. 3, 1899.
E. P. HOLLY.
WATER RETURN SYSTEM FOR STEAM GENERATORS.
(Application filed May 29, 1897.)
(No Model.) 4 Sheets—Sheet 2.
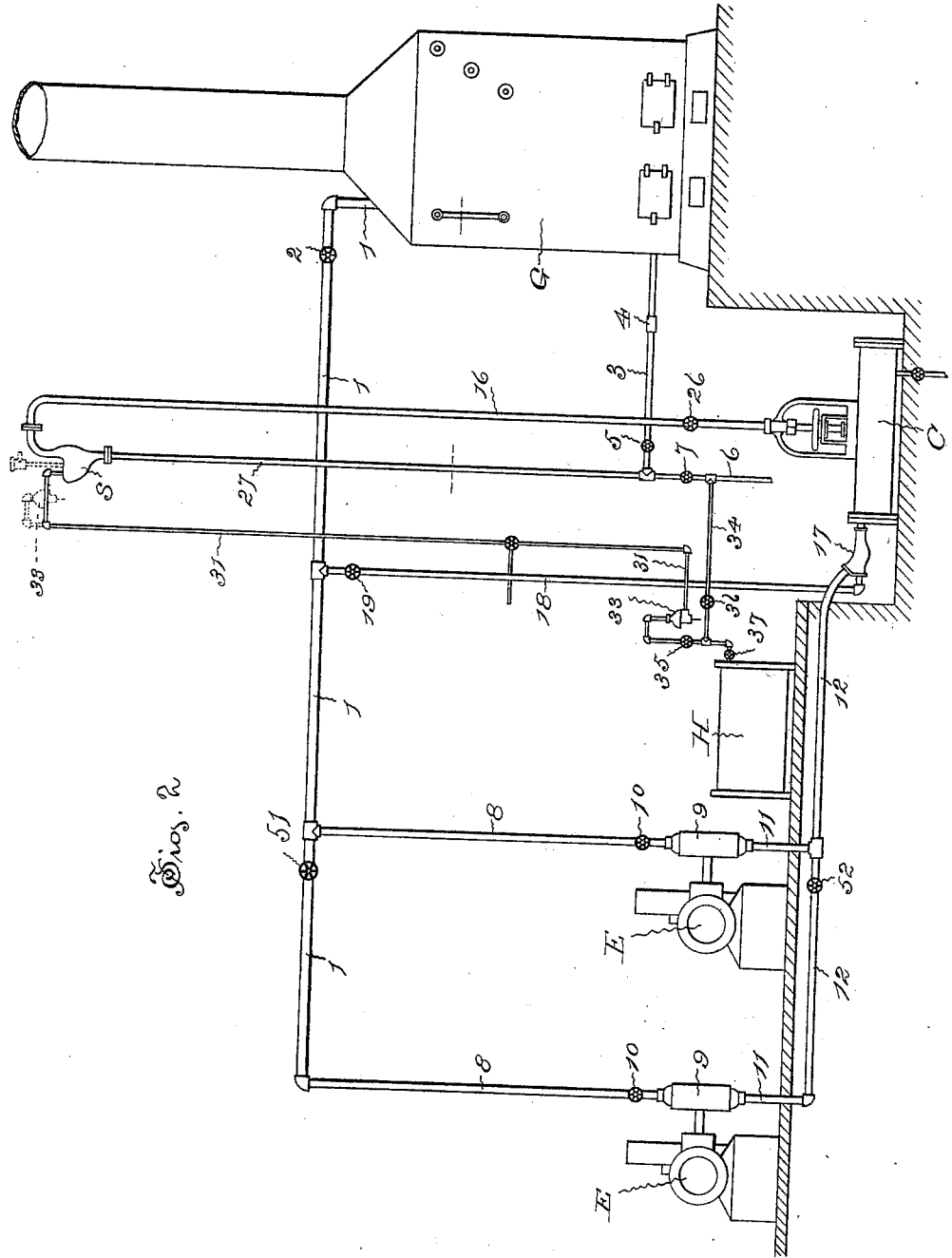
Witnesses:
E. W. Fothergill.
E. J. Hyde.
Inventor,
Edgar P. Holly, by
Harry P. Williams,
att.

No. 617,100. Patented Jan. 3, 1899.
E. P. HOLLY.
WATER RETURN SYSTEM FOR STEAM GENERATORS.
(Application filed May 29, 1897.)
(No Model.) 4 Sheets—Sheet 3.
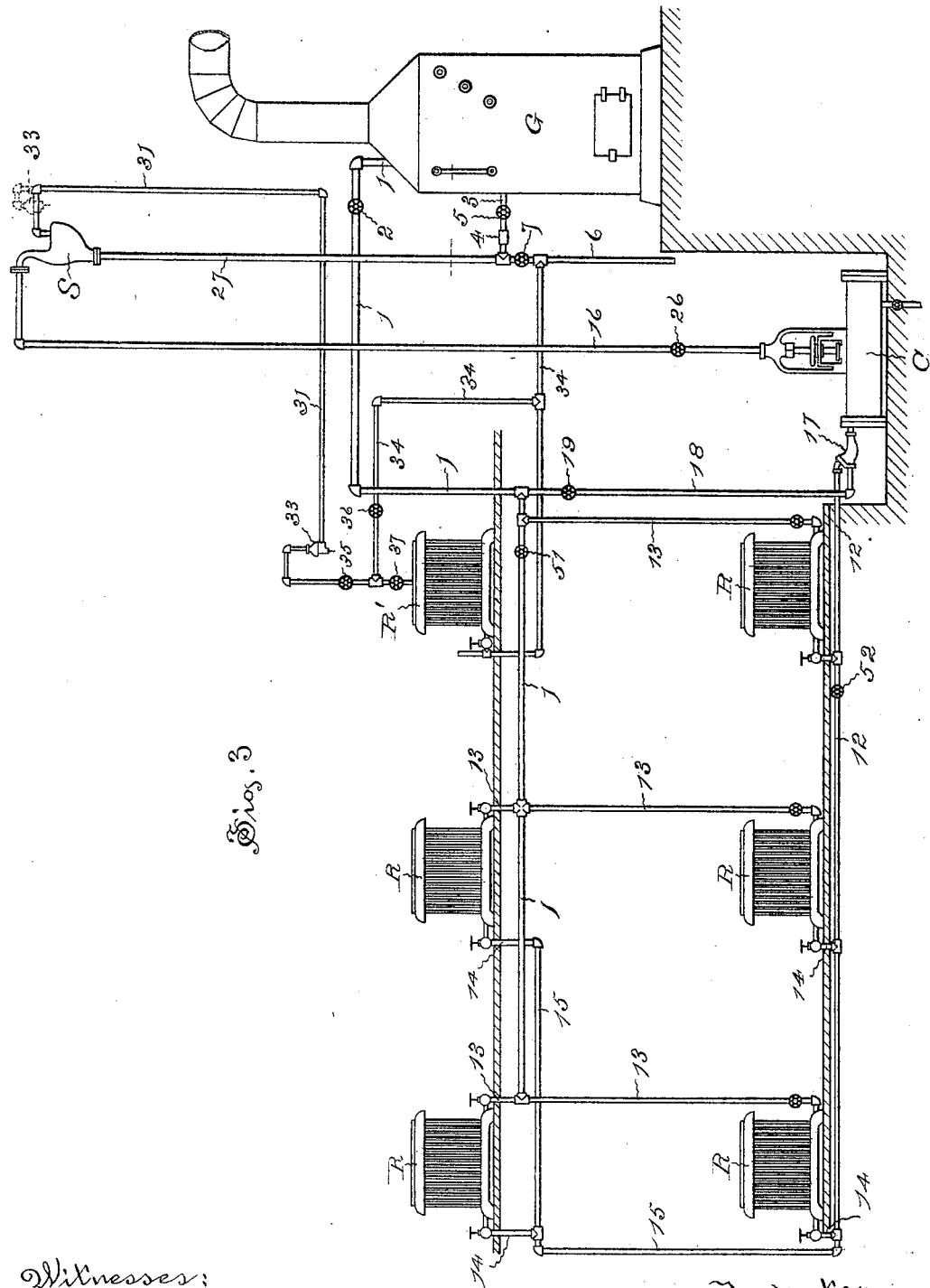

No. 617,100. Patented Jan. 3, 1899.
E. P. HOLLY.
WATER RETURN SYSTEM FOR STEAM GENERATORS.
(Application filed May 29, 1897.)
(No Model.) 4 Sheets—Sheet 4.
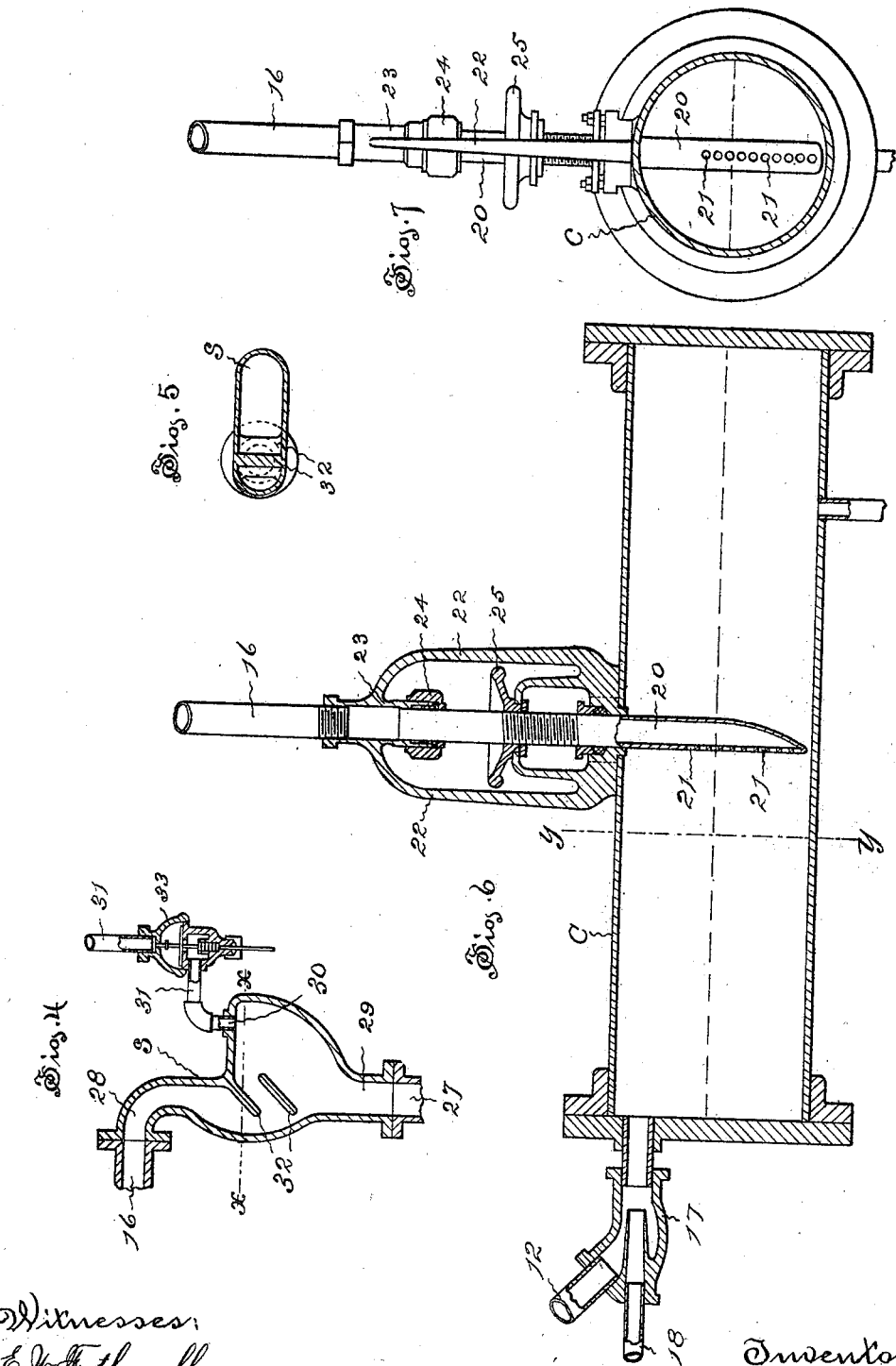
Witnesses:
E. H. Fothergill.
E. J. Hyde
Inventor,
Edgar P. Holly, by
Harry P. Williams, atty.

UNITED STATES PATENT OFFICE.

EDGAR P. HOLLY, OF HARTFORD, CONNECTICUT, ASSIGNOR TO THE HOLLY STEAM ENGINEERING COMPANY, OF SAME PLACE AND PROVIDENCE, RHODE ISLAND.

WATER-RETURN SYSTEM FOR STEAM-GENERATORS.

SPECIFICATION forming part of Letters Patent No. 617,100, dated January 3, 1899.

Application filed May 29, 1897. Serial No. 638,783. (No model.)

*To all whom it may concern:*

Be it known that I, EDGAR P. HOLLY, a citizen of the United States, residing at Hartford, in the county of Hartford and State of Connecticut, have invented certain new and useful Improvements in Water-Return Systems for Steam-Generators, of which the following is a specification.

The invention relates to a system employed with steam plants which establishes and utilizes a flow of steam for returning water of condensation and entrainment from a point below the water-level in the generator back into the generator against the pressure therein.

The object of the invention is to produce a simple, inexpensive, and efficient water-return system having sufficient range of capacity to be employed for returning water of condensation and entrainment from either a single or a series of heaters, from either a single or a series of engines, or from an aggregation of both heaters and engines, whether they utilize the steam under the same pressures, either high or low, or under different pressures, both high and low.

The embodiments of the invention illustrated have a generator for producing steam, a supply-pipe leading from the generator for conducting steam to its work, and a pipe for returning the water of condensation and entrainment into the generator connected with the return-system elements, which comprise means for collecting the water of condensation and entrainment, a riser through which the water is lifted, a stand-pipe in which the water is accumulated, and a separator or equivalent device with suitable vent and valves for inducing a vigorous flow of steam and water up the riser and precipitating the water in the stand-pipe, where it accumulates until there is sufficient head to cause a flow through the water-return pipe into the generator, as more particularly hereinafter described, and pointed out in the claims.

Of the views, Figure 1 shows an elevation of a system embodying the invention arranged for use with heaters and engines, the valves in the pipes being so located that the water of condensation and entrainment can be returned from either or both the heaters or engines, whether they employ steam at the same or different pressures. Fig. 2 shows an elevation of the system arranged for use in connection with steam-engines only. Fig. 3 shows an elevation of the system arranged for use in connection with heating-radiators only. Fig. 4 is a detail enlarged section of the separator that is shown as employed. Fig. 5 is a transverse section of the separator on plane indicated by the broken line $x$ $x$ of Fig. 4. Fig. 6 is an enlarged longitudinal section of a form of receiver that is used, and Fig. 7 is a transverse section of the receiver on plane indicated by the broken line $y$ $y$ of Fig. 6.

The system may be used with any form of steam-generator G, whether the generator supplies steam under high or low pressures to engines, pumps, heating-radiators, feed-water heaters, or other steam-using devices.

Leading from the generator is a steam-supply pipe 1, provided with a throttle-valve 2 for controlling the passage of steam from the generator. Leading into the generator is a water-return pipe 3, provided with a check-valve 4, that opens toward the generator, and a stop-valve 5, that may be used to cut off the flow of water to the generator. Connected with the return-pipe 3 is an escape-pipe 6, provided with a valve 7, that may be opened for permitting the escape of air when the system is started in operation.

As shown in Figs. 1 and 2, there may be connected with the supply-pipe 1 branch pipes 8, that lead to separators 9, which are adjacent to and communicate with engines E. These branch pipes 8 are provided with stop-valves 10. Leading from these separators 9 are drip-pipes 11, that communicate with a collector-pipe 12.

As shown in Figs. 1 and 3, connected with the supply-pipe 1 there may be branch pipes 13, that lead to heating-radiators R, which are provided with ordinary inlet and outlet valves. Leading from these radiators are drip-pipes 14, that communicate with a pipe 15, leading to the collector-pipe 12.

The collector-pipe 12 communicates with a pipe 16, preferably through the receiver C. If this system is provided for but a single radiator or a single engine, the receiver C may be but a short section of ordinary pipe, or the pipe 12 may be connected directly with the pipe 16; but where there are a number of steam-using devices from which the water of condensation and entrainment is to be collected the receiver is made considerably larger in diameter than the collector-pipe 12 and riser-pipe 16. Where a receiver is employed, the collector-pipe 12 may open directly therein; but it is preferred that the collector-pipe 12 shall communicate with the receiver through an ordinary ejector 17, and it is preferred to lead from the supply-pipe 1 to the ejector 17 a pipe 18, provided with a stop-valve 19. This pipe is not essential to the operation of the system, but with it the system will operate more efficiently, for it provides a short cut for a portion of the steam in order to equalize the pressure and insure a good flow of steam up the pipe 16. The equalizing-pipe 18 may enter the receiver at any desired point above the water-line therein; but it is better to have this pipe communicate with the receiver through the ejector 17, so that the flow of steam will aid the flow of water of condensation and entrainment through the collector-pipe 12.

The receiver may be of any suitable construction; but it is preferably a cylindrical tank with ordinary inlet, outlet, and blow-off perforations. The inlet of the receiver, as shown in Fig. 6, is opposite the end of the ejector 17, while the outlet is occupied by a pipe 20, having a vertically-arranged series of orifices 21 in its wall. The pipe 20 extends through the top of the receiver and on the outside is provided with an ordinary stuffing-box. The lower end of the pipe 20, which is below the level of the water-line in the receiver, is closed, and a part of the orifices 21 are below the water-line and a part above. Instead of a series of orifices a vertical slot that extends through the wall of the pipe above and below the water-line may be used. The stuffing-box for the pipe 20 is connected with a frame that is secured to the top of the receiver, which frame has vertical arms 22, that carry a coupling 23. The lower end of the coupling is provided with a stuffing-box 24 for packing the upper end of the pipe 20, and the upper end of the coupling is threaded for receiving the threaded end of the pipe 16. The pipe 20 is screw-threaded between the two stuffing-boxes, and turning on the threads of this part is a hand-wheel 25, which is held against longitudinal movement by a part of the frame, so that when the hand-wheel is rotated the pipe 20 may be adjusted vertically.

The pipe 16, provided with a controlling-valve 26, extends from the coupling 23 upward to a point some distance above the water-level in the generator and forms what may be termed the "riser." This riser communicates with a separator S, which is located above the water-line in the generator and communicates with a stand-pipe 27, that opens at its lower end into the return-pipe 3.

The separator S may be of any suitable form, but is preferably made, as shown in Figs. 4 and 5, with an inlet-passage 28, to which is connected the riser 16, an outlet-passage 29, to which the stand-pipe 27 is connected, and an outlet 30, to which an exhaust-pipe 31 is connected. The outlet 30 is restricted—that is, it has a much smaller area than the inlet 28 and outlet 29. The separator is provided with partitions or baffle-plates 32, which serve to form a tortuous passage for the steam through the separator.

The pipe 31 from the outlet 30 may have a hand-valve; but it is preferred to provide this pipe with an automatic reducing-valve 33 of common construction, which valve may be located close to the outlet 30 or at some distance therefrom. This pipe 31 may open to the atmosphere, so that steam passing through the reducing-valve may escape directly, or the pipe may lead to a pump P, as shown in Fig. 1, or may be connected with a pipe 34, leading to the pipe 6, that opens to the atmosphere, as shown in Figs. 1 and 2, or it may lead to a feed-water heater H, as shown in Fig. 2, or it may lead to a radiator R', as shown in Fig. 3, which radiator may exhaust through a pipe 34 and the pipe 6. Suitable valves 35 36 37 are located in the pipes 31 and 34 to direct the flow of the exhaust through the different passages, as desired.

If the system is arranged with both heaters and engines, as illustrated in Fig. 1, a reducing-valve 38 of common construction and a stop-valve 39 may be placed between the supply-pipe 1 and the branch pipe 13, and a pipe 40, with a valve 41, may lead around the reducing-valve from the live-steam-equalizing pipe 18 to the branch pipe 13. A valve 42 may be located in the supply-pipe 1 adjacent to the reducing-valve. An equalizing-pipe 43, with a valve 44, may be located so as to connect a branch of the radiator supply-pipe 13 directly with the pipe 15, that collects the drip from the radiators. The pump P may be connected with the pipe 15 by a pipe 45, provided with a valve 46, and connecting the pump with the collector-pipe 12 is the pipe 47, with a valve 48. In the pipe 15, near the pump, is a valve 49, and in the collector-pipe 12, near the pump, is a valve 50.

If the system is arranged with only engines or only radiators or any series of devices employing steam at the same pressures, as illustrated in Figs. 2 and 3, the reducing-valve 38 is not required. If it is desired to arrange the system for use with only one engine or only one radiator or similar device, a valve 51 can be located in the supply-pipe 1 and a valve 52 can be located in the collector-pipe 12 to shut those pipes from communication with the pipes connected with the devices not in use. If there is but one steam-using device, the steam-supply pipe 1 may end at the valve 51 and the collector-pipe 12 may end at the valve 52.

When the system arranged as shown in Fig. 1 is employed with steam plants using varying pressures of steam—for instance, with high-pressure engines and low-pressure heating-radiators—the valves 36, 41, and 49 are closed. All of the remaining valves are opened. After the air in the system at the start has escaped the valve 7 is also closed.

Steam from the generator passes through the supply-pipe 1 to the branch pipes 8 and the separators 9, and in these separators the water of condensation and entrainment is separated from the dry steam, the dry steam passing to the engines E and the water flowing through the drip-pipes 11 to the collector-pipe 12. From the supply-pipe 1 steam also passes through the reducing-valve 38, which reduces the pressure, and then through the branches 13 to the radiators. The water of condensation and entrainment from the radiators passes through the drip-pipes 14 to the pipe 15, from which the pump passes it to the collector-pipe 12. The pump is only used when the steam is employed with the various devices at different pressures, and its use is to get the water of condensation and entrainment under low pressure from the radiator drip-pipes into the collector-pipe with the water of condensation and entrainment under higher pressure from the engines. Some steam passes from the pipe 13 through the pipe 43 to the pipe 15 without passing through the radiators, and while not essential to the working of the system with this pipe there is a shorter passage for the steam to the pipe 15 and therefore less reduction of pressure due to friction and radiation and a more perfect circulation through the lower-pressure part of the system. With this pipe the pressure in the pipe 15 will more nearly equal that in the pipe 12, and there will be less work for the pump to perform. From the collector-pipe 12 the water of condensation and entrainment flows into the receiver.

If all of the devices utilize steam at the same pressure, the valve 39 may be closed, so that steam will not pass through the reducing-valve 38, and the valve 41 opened, so that steam can pass from the supply-pipe 1 through the pipes 18 and 40 to the radiator branch pipes 13. With steam in all of the devices at the same pressure it will be unnecessary to utilize the pump, so that the valve 37 may be closed and the valve 36 opened to divert exhaust-steam from the pump and the valves 46 and 48 closed and the valve 49 opened, so that water from the radiators will flow directly into the collector-pipe 12 without passing through the pump.

If the engines only are being used, the valves 39 and 41 are closed to prevent steam from passing to the branch pipes 13, that communicate with the radiators, and the valves 37, 46, 48, and 49 are closed to prevent steam from passing through the pump and back into the radiator part of the system, the rest of the valves, except, of course, 7, being left open.

If the radiators only are being used under low pressure, the valves 19, 37, 42, 46, 48, and 50 are closed, the valves 39 and 41 being opened. Then from the supply-pipe 1 steam can only pass to the radiators through the reducing-valve 38. The pump is not required if the radiators and engines utilize steam at the same pressure, or if either the radiators or engines are used separately under generator-pressure, or if there are nothing but engines, as shown in Fig. 2, or nothing but radiators, as shown in Fig. 3, in the plant from which the water is to be removed.

With the engine system of Fig. 2 steam from the generator passes through the supply-pipe 1 directly to the separators 9, which divert the dry steam to the engines and send the water of condensation and entrainment into the collector-pipe 12, from which the water passes into the receiver.

With the heating system of Fig. 3 steam from the generator passes from the supply-pipe 1 directly to the branch pipes 13 and then through the radiators and drip-pipes 14 to the collector-pipe 12, from which the water passes into the receiver.

In all of the arrangements illustrated mingled steam and water from the collector-pipe 12 enter the receiver, the flow preferably being assisted by the movement of the steam through the ejector 17. The water falls to the bottom of the receiver, where it accumulates and forms a water-level. The level of the water in the receiver will depend on the position of the orifices in the pipe 20, but will never rise high enough to close all of the orifices. By the use of the pipe 18 the pressure in the receiver is maintained at substantially the pressure in the generator. The water passes into the pipe 20 through the lower orifices, while steam passes through the upper orifices and carries the water in detached particles up the riser 16 into the separator S, where the steam is separated from the water, the water being precipitated in the stand-pipe 27 and the steam escaping to the exhaust-pipe 31. The flow of steam through the riser is induced and maintained by the escape of steam through the valve 33 or other suitable vent in the exhaust-pipe 31 or upper end of the riser 16, and by adjusting this escape-outlet the flow of steam may be regulated. With an automatic reducing-valve of common construction there will be the necessary escape of steam to secure the proper continuous flow of steam and waste up through the riser, and thus the flow up the riser will be automatically maintained regardless of the steam-pressure in the generator. The escape of steam from the valve 33 is so small compared with the amount of steam the riser 16 is capable of supplying that the pressure in the separator and on top of the column of water that accumulates in the stand-pipe 27 is not appreciably reduced as a result of the escape of steam through the valve 33, but is maintained at substantially the pressure of the steam in the receiver. Of course, there is a slight decrease in pressure due to friction, radiation, and similar factors, but with the equalizing-pipes this does not materially lower the pressure in the separator below that in the generator.

The water from the separator accumulates in the stand-pipe 27 and establishes a water-level therein. In practice the pressure in the separator and on the water column in the stand-pipe 27 is somewhat less than the generator-pressure, because of the loss due to friction, radiation, and the like, and consequently the water will accumulate in the stand-pipe until it rises higher than the water-level in the generator before the weight of the water column, together with the pressure in the separator, will overbalance the generator-pressure and open the check-valve 4. When the water column reaches such a height that its weight, together with the pressure in the separator, overcomes the generator-pressure, the water will flow through the check-valve into the generator.

In starting the system the valve 7 is opened and air allowed to escape. The steam escaping through the pipe 31 may be exhausted into the atmosphere directly, or it may be used to heat feed-water for running a pump or for any other purpose desired. The equalizing-pipe 18 is not essential, but by its use a shorter passage for the steam to the receiver and riser is provided, and there is therefore less reduction in pressure in the receiver due to friction and radiation and a more effective pressure obtained for carrying up the particles of water through the riser, which insures a better and more free circulation through the system. By the employment of this equalizing-pipe 18 the pressure in the separator and on top of the column of water is maintained at more nearly the pressure in the generator, so that the water in the stand-pipe does not rise very high above the water-level in the generator and a comparatively short stand-pipe may be used. By the use of the ejector 17 the collection of water of condensation and entrainment is facilitated, and by the use of a comparatively large receiver a considerable quantity of water can be collected and subjected to the action of the current of steam which carries it to the separator. By adjusting the valve 33 or vent from the separator the flow of steam up the riser may be regulated and controlled to suit the conditions under which the system is used.

With this system there is a vigorous, rapid, and continuous flow of steam through the riser, which catches up from the receiver and carries with it water in the form of detached particles. This flow of steam is enough to prevent the accumulation of sufficient amount of water in the receiver to interrupt the operation of the system. The flow of steam and water up the riser is not limited to the amount of condensation, nor is it dependent on such a varying factor as condensation. If there is a large amount of water of condensation and entrainment to be returned, the flow of steam can be regulated so that a larger quantity of water can be lifted from the riser than at other times. There is nothing in this system to get out of order, and it operates smoothly and uniformly. The capacity of a system working as described is practically unlimited, and it can be applied to all the varying classes of steam plants, and its use results in a saving of energy with a consequent increase of efficiency of the plant.

I claim as my invention—

1. The combination with a generator, of a steam-supply pipe leading therefrom, a water-return pipe leading thereto, one or more steam-using devices communicating with the steam-supply pipe, a drip-pipe for collecting the water of condensation and entrainment from the steam-using devices, a separator located some distance above the water-line in the generator and having a reduced open exhaust-outlet that permits the escape of steam for inducing an upward flow of steam and water, a riser communicating at its lower end with the drip-pipe and at its upper end with the separator, and a stand-pipe communicating at its upper end with the separator and at its lower end with the water-return pipe, substantially as specified.

2. The combination with a generator, of a steam-supply pipe leading therefrom, a water-return pipe leading thereto, one or more steam-using devices communicating with the steam-supply pipe, a drip-pipe for collecting the water of condensation and entrainment from the steam-using devices, a receiver communicating with the drip-pipe, a separator located some distance above the water-line in the generator and having a reduced open exhaust-outlet that permits the escape of steam for inducing an upward flow of steam and water, a riser communicating at its lower end with the receiver and at its upper end with the separator, and a stand-pipe communicating at its upper end with the separator and at its lower end with the water-return pipe, substantially as specified.

3. The combination with the generator, of a steam-supply pipe leading therefrom, a water-return pipe leading thereto, one or more steam-using devices communicating with the steam-supply pipe, a drip-pipe for collecting the water of condensation and entrainment from the steam-using devices, a receiver communicating with the drip-pipe, said receiver having an adjustable outlet, a separator located some distance above the water-line in the generator and having an exhaust-outlet for inducing an upward flow of steam and water, a riser communicating at its lower end with the receiver and at its upper end with the separator, and a stand-pipe communicating at its upper end with the separator and at its lower end with the water-return pipe, substantially as specified.

4. The combination with a generator, of a steam-supply pipe leading therefrom, a water-return pipe leading thereto, one or more steam-using devices communicating with the steam-supply pipe, a drip-pipe for collecting the water of condensation and entrainment from the steam-using devices, an equalizing-pipe communicating with the steam-supply pipe and with the drip-pipe, a separator located some distance above the water-line in the generator and having a reduced open exhaust-outlet that permits the escape of steam for inducing an upward flow of steam and water, a riser communicating at its lower end with the drip-pipe and at its upper end with the separator, and a stand-pipe communicating at its upper end with the separator and at its lower end with the water-return pipe, substantially as specified.

5. The combination with a generator, of a steam-supply pipe leading therefrom, a water-return pipe leading thereto, one or more steam-using devices communicating with the steam-supply pipe, a drip-pipe for collecting the water of condensation and entrainment, an equalizing-pipe communicating with the steam-supply pipe and with the drip-pipe, an ejector communicating with the equalizing-pipe and with the drip-pipe, a separator located some distance above the water-line in the generator and having a reduced open exhaust-outlet that permits the escape of steam for inducing an upward flow of steam and water, a riser communicating at its lower end with the drip-pipe and at its upper end with the separator, and a stand-pipe communicating at its upper end with the separator and at its lower end with the water-return pipe, substantially as specified.

6. The combination with a generator, of a steam-supply pipe leading therefrom, a water-return pipe leading thereto, one or more steam-using devices communicating with the steam-supply pipe, a drip-pipe for collecting the water of condensation and entrainment, an equalizing-pipe communicating with the steam-supply pipe and with the drip-pipe, an ejector communicating with the collector-pipe and equalizing-pipe, a receiver communicating with the ejector, a separator located some distance above the water-line in the generator and having an exhaust-outlet for inducing an upward flow of steam and water, a riser communicating at its lower end with the drip-pipe and at its upper end with the separator, and a stand-pipe communicating at its upper end with the separator and at its lower end with the water-return pipe, substantially as specified.

7. The combination with a generator, of a steam-supply pipe leading therefrom, a water-return pipe leading thereto, one or more steam-using devices communicating with the steam-supply pipe, a drip-pipe for collecting the water of condensation and entrainment, a separator located some distance above the water-line in the generator and having a reduced open exhaust-outlet that permits the escape of steam for inducing an upward flow of steam and water, a steam-using device connected with the exhaust-outlet, a riser communicating at its lower end with the drip-pipe and at its upper end with the separator, and a stand-pipe communicating at its upper end with the separator and at its lower end with the water-return pipe, substantially as specified.

8. The combination with a generator, of a steam-supply pipe leading therefrom, a water-return pipe leading thereto, one or more steam-using devices communicating with the steam-supply pipe, a drip-pipe for collecting the water of condensation and entrainment, a separator located some distance above the water-line in the generator and having a reduced open exhaust-outlet that permits the escape of steam for inducing an upward flow of steam and water, an adjustable valve that can be set to regulate the size of the passage in the exhaust-outlet, a riser communicating at its lower end with the drip-pipe and at its upper end with the separator, and a stand-pipe communicating at its upper end with the separator and at its lower end with the water-return pipe, substantially as specified.

9. The combination with a generator, of a steam-supply pipe leading therefrom, a water-return pipe leading thereto, one or more steam-using devices communicating with the steam-supply pipe, a drip-pipe for collecting the water of condensation and entrainment, a separator located some distance above the water-line in the generator and having a reduced open exhaust-outlet that permits the escape of steam for inducing an upward flow of steam and water, an automatic pressure-reducing valve located in the exhaust-outlet, a riser communicating at its lower end with the drip-pipe and at its upper end with the separator, a stand-pipe communicating at its upper end with the separator and at its lower end with the water-return pipe, substantially as specified.

10. The combination with a generator, of a steam-supply pipe leading therefrom, a water-return pipe leading thereto, one or more steam-using devices communicating with the steam-supply pipe, drip-pipes for collecting the water of condensation and entrainment, a pump connected with the drip-pipes, a separator located some distance above the water-line in the generator and having an exhaust-outlet for inducing an upward flow of steam and water, a riser communicating at its lower end with a drip-pipe and at its upper end with the separator, and a stand-pipe communicating at its upper end with the separator and at its lower end with the water-return pipe, substantially as specified.

11. The combination with a generator, of a steam-supply pipe leading therefrom, a water-return pipe leading thereto, one or more steam-using devices communicating with the steam-supply pipe, drip-pipes leading from the steam-using devices, a pipe for collecting the water of condensation and entrainment communicating with the drip-pipes, an equalizing-pipe connected between the steam-supply pipe and a drip-pipe, a separator located some distance above the water-line in the generator and having an exhaust-outlet for inducing an upward flow of steam and water, a riser communicating at its lower end with a drip-pipe and at its upper end with the separator, and a stand-pipe communicating at its upper end with the separator and at its lower end with the water-return pipe, substantially as specified.

12. The combination with a generator, of a steam-supply pipe leading therefrom, a water-return pipe leading thereto, steam-using devices communicating with the steam-supply pipe, a reducing-valve located between the steam-supply pipe and a part of the steam-using devices, a drip-pipe for collecting the water of condensation and entrainment from the steam-using devices, a separator located some distance above the water-line in the generator and having an exhaust-outlet for inducing an upward flow of steam and water, a riser communicating at its lower end with the drip-pipe and at its upper end with the separator, and a stand-pipe communicating at its upper end with the separator and at its lower end with the water-return pipe, substantially as specified.

13. The combination with a generator, of a high-pressure steam-pipe communicating therewith, a low-pressure steam-pipe, a reducing-valve between the high-pressure and low-pressure pipes, a receiver connected with the high-pressure steam-pipe, means for delivering the water of condensation and entrainment from both the high-pressure and low-pressure steam-pipes into said receiver, and means for returning the water from the receiver to the generator, substantially as specified.

14. The combination with a generator, of one or more high-pressure steam-using devices; one or more low-pressure steam-using devices, means for supplying steam to said devices from the generator, a receiver, means for delivering the water of condensation and entrainment from the steam-using devices into the receiver, a riser communicating with the receiver at its lower end and extending above the water-level in the generator, a valved outlet for the escape of steam from the upper end of the riser, and a stand-pipe communicating with the riser and with the generator, substantially as specified.

15. The combination with one or more high-pressure steam-using devices and one or more low-pressure steam-using devices, of a receiver located below said steam-using devices, a pipe for delivering the water of condensation and entrainment from the high-pressure steam-using devices into the receiver, a pump for delivering the water of condensation and entrainment from the low-pressure steam-using devices into the receiver, a riser communicating at its lower end with the receiver, a valved outlet at the upper end of the riser for the escape of steam, and a stand-pipe communicating with the riser and with the generator, substantially as specified.

16. The combination with a generator, of a steam-supply pipe leading therefrom, a series of high-pressure steam-using devices communicating with said pipe, a reducing-valve communicating with said pipe, a supply-pipe leading from said reducing-valve, a series of low-pressure steam-using devices, a drip-pipe for receiving the water of condensation and entrainment from the low-pressure devices, an equalizing-pipe between the supply and drip pipes of the low-pressure devices, a drip-pipe for receiving the water of condensation and entrainment from the high-pressure devices, means for forcing the water from the low-pressure drip-pipe into the high-pressure drip-pipe, a receiver for receiving water from the high and low pressure drip-pipes, and means for returning the water from the receiver to the generator, substantially as specified.

17. The combination with a steam-generator of a steam-supply pipe leading therefrom, a separator located some distance above the level of the water-line in the generator and having a reduced open exhaust-outlet that permits the escape of steam whereby an upward flow of steam and water is induced, a riser communicating at its lower end with a receiver for water of condensation and entrainment and at its upper end with the separator, a stand-pipe communicating at its upper end with the separator, a return-pipe leading from the stand-pipe to the generator, drip-pipes communicating with the receiver, and a connection between the steam-supply pipe and the receiver, substantially as specified.

18. In combination with the riser, stand-pipe and exhaust-pipe of a water-return system, a separator provided with an inlet for steam and water at its upper end, a water-outlet at its lower end and an open but restricted steam-outlet at its upper end, and pipes leading to the respective inlets and outlets from the riser, stand-pipe and exhaust-pipe, whereby a constant flow of mingled steam and water through the system to the inlet and flow of water to the water-outlet is effected without materially reducing the steam-pressure in the separator, by a small flow of steam through the open restricted steam-outlet, substantially as specified.

19. In combination with the riser, the stand-pipe and the exhaust-pipe of a water-return system, a separator provided with an inlet for steam and water at its upper end, a water-outlet at its lower end, a reduced steam-outlet at its upper end, an automatic reducing-valve connected with the reduced steam-outlet, and pipes leading to the respective inlets and outlets from the riser, the stand-pipe and the exhaust-pipe, whereby a constant flow of mingled steam and water through the system to the inlet and flow of water through the water-outlet is effected without materially reducing the steam-pressure in the separator, by a small flow of steam through the automatic reducing-valve, substantially as specified.

20. The combination with a receiver for receiving the water of condensation and entrainment from a series of steam-using devices, of an adjustable outlet for said receiver, means for adjusting the outlet with relation to the water-level in the receiver, a riser communicating with said adjustable outlet, an outlet for steam from said riser, and means for controlling the escape of steam from said outlet, substantially as specified.

21. The combination with a receiver for receiving the water of condensation and entrainment from a series of steam-using devices, of a riser communicating at its lower end with said receiver, a separator located at some distance above the receiver communicating with the upper end of the riser and provided with a reduced exhaust-outlet for steam, means for automatically controlling the escape of steam from said exhaust-outlet from the separator and a stand-pipe communicating with said riser, substantially as specified.

22. A steam and water receiver adapted to be connected to a steam-return system, and a vertically-adjustable outlet-pipe connected with said receiver, substantially as specified.

23. A steam and water receiver adapted to be connected to a steam-return system, and a vertically-adjustable outlet-pipe having a vertically-arranged elongated opening therein, substantially as specified.

24. The combination with a steam-supply and steam-using plant, of a pipe for collecting the water of condensation and entrainment, a riser communicating with said pipe, a reduced exhaust-outlet for the escape of steam from said riser, means for automatically controlling the escape of steam from said outlet, and a stand-pipe communicating with said riser and with the generator, substantially as specified.

EDGAR P. HOLLY.

Witnesses:
H. R. WILLIAMS,
E. W. FOTHERGILL.